United States Patent
Schleyen et al.

(10) Patent No.: US 11,151,710 B1
(45) Date of Patent: Oct. 19, 2021

(54) AUTOMATIC SELECTION OF ALGORITHMIC MODULES FOR EXAMINATION OF A SPECIMEN

(71) Applicant: Applied Materials Israel Ltd., Rehovot (IL)

(72) Inventors: Ran Schleyen, Rehovot (IL); Eyal Zakkay, Kfar Saba (IL); Boaz Cohen, Lehavim (IL)

(73) Assignee: Applied Materials Israel Ltd., Rehovot (IL)

(*) Notice: Subject to any disclaimer, the term of this patent is extended or adjusted under 35 U.S.C. 154(b) by 0 days.

(21) Appl. No.: 16/866,463

(22) Filed: May 4, 2020

(51) Int. Cl.
*G06T 7/00* (2017.01)

(52) U.S. Cl.
CPC .. *G06T 7/0004* (2013.01); *G06T 2207/20076* (2013.01); *G06T 2207/20081* (2013.01); *G06T 2207/20084* (2013.01)

(58) Field of Classification Search
CPC ......... G06T 7/0004; G06T 2207/20084; G06T 2207/20081; G06T 2207/20076
See application file for complete search history.

(56) References Cited

U.S. PATENT DOCUMENTS

| 2012/0275671 A1* | 11/2012 | Eichhorn | G06T 7/0004 382/128 |
| 2014/0133727 A1* | 5/2014 | Oktay | G06T 7/33 382/131 |
| 2021/0073972 A1* | 3/2021 | Wu | G06T 3/0006 |

OTHER PUBLICATIONS

Olaode et al., "Unsupervised Classification of Images: A Review" Sep. 2014, 10 pages, https://www.researchgate.net/publication/265729668_Unsupervised_Classification_of_Images_A_Review. Accessed Dec. 23, 2020.
"Multi-armed bandit" from Wikipedia, 8 pages, https://en.wikipedia.org/wiki/Multi-armed_bandit. Accessed Dec. 23, 2020.
Adhikari et al., "Faster bounding box annotation for object detection in indoor scenes," Nov. 2018, pp. 1-6. In 2018 7th European Workshop on Visual Information Processing (EUVIP), IEEE.

(Continued)

*Primary Examiner* — Ping Y Hsieh
(74) *Attorney, Agent, or Firm* — Lowenstein Sandler LLP

(57) ABSTRACT

There is provided a system comprising a processor configured to obtain a set of images of a semiconductor specimen, (1) for an image of the set of images, select at least one algorithmic module $M_S$ out of a plurality of algorithmic modules, (2) feed the image to $M_S$ to obtain data $D_{MS}$ representative of one or more defects in the image, (3) obtain a supervised feedback regarding rightness of data $D_{MS}$, (4) repeat (1) to (3) for a next image until a completion criterion is met, wherein an algorithmic module selected at (1) is different for at least two different images of the set of images, generate, based on the supervised feedback, a score for each of a plurality of the algorithmic modules, and use scores to identify one or more algorithmic modules $M_{best}$ as the most adapted for providing data representative of one or more defects in the set of images.

17 Claims, 9 Drawing Sheets

(56) References Cited

OTHER PUBLICATIONS

Acuna et al., "Efficient interactive annotation of segmentation datasets with polygon-rnn++," 2018, pp. 859-868, In Proceedings of the IEEE conference on Computer Vision and Pattern Recognition.
Konyushkova et al., "Learning intelligent dialogs for bounding box annotation," 2018, pp. 9175-9184, In Proceedings of the IEEE Conference on Computer Vision and Pattern Recognition.
Papadopoulos et al., "We don't need no bounding-boxes: Training object class detectors using only human verification," 2016, pp. 854-863, In Proceedings of the IEEE conference on computer vision and pattern recognition.

\* cited by examiner

AUTOMATIC SELECTION OF ALGORITHMIC MODULES FOR EXAMINATION OF A SPECIMEN

TECHNICAL FIELD

The presently disclosed subject matter relates, in general, to the field of examination of a specimen, and, more specifically, to automating the examination of a specimen.

BACKGROUND

Current demands for high density and performance associated with ultra large-scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter there is provided a system of examination of a semiconductor specimen, comprising a processor and memory circuitry (PMC) configured to: obtain a set of images of one or more semiconductor specimens, upon obtaining a plurality of algorithmic modules, wherein each algorithmic module is configured to provide, based on an image of a semiconductor specimen, data representative of one or more defects in the image: (1) for an image of the set of images, select at least one algorithmic module $M_S$ out of the plurality of algorithmic modules, (2) feed the image to the at least one algorithmic module $M_S$ to obtain data $D_{MS}$ representative of one or more defects in the image, (3) obtain a supervised feedback regarding rightness of data $D_{MS}$ provided by the algorithmic module $M_S$, (4) repeat (1) to (3) for a next image of the set of images until a completion criterion is met, wherein an algorithmic module selected at (1) is different for at least two different images of the set of images, wherein the system is configured to generate, based at least on the supervised feedback, a score for each of a plurality of the algorithmic modules, and use scores associated with the algorithmic modules to identify one or more algorithmic modules $M_{best}$ as the most adapted among the plurality of algorithmic modules for providing data representative of one or more defects in the set of images.

According to some embodiments, selecting the at least one algorithmic module $M_S$ out of the plurality of algorithmic modules is provided by a selection module trained to select the at least one algorithmic module $M_S$.

According to some embodiments, the score generated for an algorithmic module is representative of a ratio between a number of times a positive feedback has been obtained for this algorithmic module and a number of times this algorithmic module has been selected at (1).

According to some embodiments, the supervised feedback obtained at (3) impacts subsequent selection of the at least one algorithmic module $M_S$ at (1) by the selection module.

According to some embodiments, the system is configured to generate at (3) a score for the algorithmic module $M_S$, which is representative of a probability that the algorithmic module $M_S$ is adapted to provide data representative of one or more defects in the set of images, wherein the score depends at least on the supervised feedback.

According to some embodiments, the system is configured to select at (1) the algorithmic module $M_S$ based at least on a score associated with the algorithmic module $M_S$ and generated based at least on a supervised feedback previously obtained at (3).

According to some embodiments, if the supervised feedback validates $D_{MS}$ at (3), the score associated with $M_S$ is increased with respect to a score previously associated with $M_S$, if the supervised feedback rejects $D_{MS}$ at (3), the score associated with $M_S$ is decreased with respect to a score previously associated with $M_S$, and the at least one algorithmic module $M_{best}$ is associated with a score which is the highest among the plurality of algorithmic modules.

According to some embodiments, the system is configured to generate a score for each algorithmic module based on: a first probability provided by a selection module trained to select the at least one algorithmic module $M_S$, and a second probability generated based at least on the supervised feedback.

In accordance with other aspects of the presently disclosed subject matter there is provided a method of examination of a semiconductor specimen, comprising, by a processor and memory circuitry (PMC): obtaining a set of images of one or more semiconductor specimens, upon obtaining a plurality of algorithmic modules, wherein each algorithmic module is configured to provide, based on an image of a semiconductor specimen, data representative of one or more defects in the image, (1) for an image of the set of images, selecting at least one algorithmic module $M_S$ out of the plurality of algorithmic modules, (2) feeding the image to the at least one algorithmic module $M_S$ to obtain data $D_{MS}$ representative of one or more defects in the image, (3) obtaining a supervised feedback regarding rightness of data $D_{MS}$ provided by the algorithmic module $M_S$, (4) repeating (1) to (3) for a next image of the set of images until a completion criterion is met, wherein an algorithmic module selected at (1) is different for at least two different images of the set of images, generating, based at least on the supervised feedback, a score for each of a plurality of the algorithmic modules, using scores associated with the algorithmic modules to identify one or more algorithmic modules $M_{best}$ as the most adapted among the plurality of algorithmic modules for providing data representative of one or more defects in the set of images.

According to some embodiments, selecting the at least one algorithmic module $M_S$ out of the plurality of algorithmic modules is provided by a selection module trained to select the at least one algorithmic module $M_S$.

According to some embodiments, the score generated for an algorithmic module is representative of a ratio between a number of times a positive feedback has been obtained for this algorithmic module and a number of times this algorithmic module has been selected at (1).

According to some embodiments, the supervised feedback obtained at (3) impacts subsequent selection of the at least one algorithmic module $M_S$ at (1) by the selection module.

According to some embodiments, the method comprises generating at (3) a score for the algorithmic module $M_S$, which is representative of a probability that the algorithmic module $M_S$ is adapted to provide data representative of one or more defects in the set of images, wherein the score depends at least on the supervised feedback.

According to some embodiments, the method comprises selecting at (1) the algorithmic module $M_S$ based at least on a score associated with the algorithmic module $M_S$ and generated based at least on a supervised feedback previously obtained at (3).

According to some embodiments, if the supervised feedback validates $D_{MS}$ at (3), the score associated with $M_S$ is increased with respect to a score previously associated with $M_S$, if the supervised feedback rejects $D_{MS}$ at (3), the score associated with $M_S$ is decreased with respect to a score previously associated with $M_S$, and the at least one algorithmic module $M_{best}$ is associated with a score which is the highest among the plurality of algorithmic modules.

According to some embodiments, the method includes generating a score for each algorithmic module based on a first probability provided by a selection module trained to select the at least one algorithmic module $M_S$, and a second probability generated based at least on the supervised feedback.

A non-transitory computer readable medium comprising instructions that, when executed by a processor and memory circuitry (PMC), cause the PMC to perform operations as described above.

According to some embodiments, the proposed solution provides automatic selection of the most adapted algorithmic module among a plurality of algorithmic modules (each including instructions representative of a model), for providing data representative of defects on a given set of images of specimens.

As a consequence, according to some embodiments, determination of data representative of defects in the given set of images is more accurate and efficient.

According to some embodiments, there is provided a robust solution.

According to some embodiments, assistance is provided to an operator to annotate images in reduced time while ensuring diversity and relevance of the images to be annotated.

According to some embodiments, the level of intervention of an operator (annotations by the operator) is optimized.

According to some embodiments, the proposed solution allows improving a bank of algorithmic modules (each including instructions representative of a model).

According to some embodiments, the proposed solution allows operating on a reduced number of images representative of a larger set of images, thereby saving computation time.

According to some embodiments, the proposed solution allows reducing the number of candidate algorithmic modules among which a recommended algorithmic module has to be selected, thereby saving computation time and storage requirement.

According to some embodiments, the proposed solution can be used for various tasks such as defect identification, defect segmentation, defect classification, etc.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
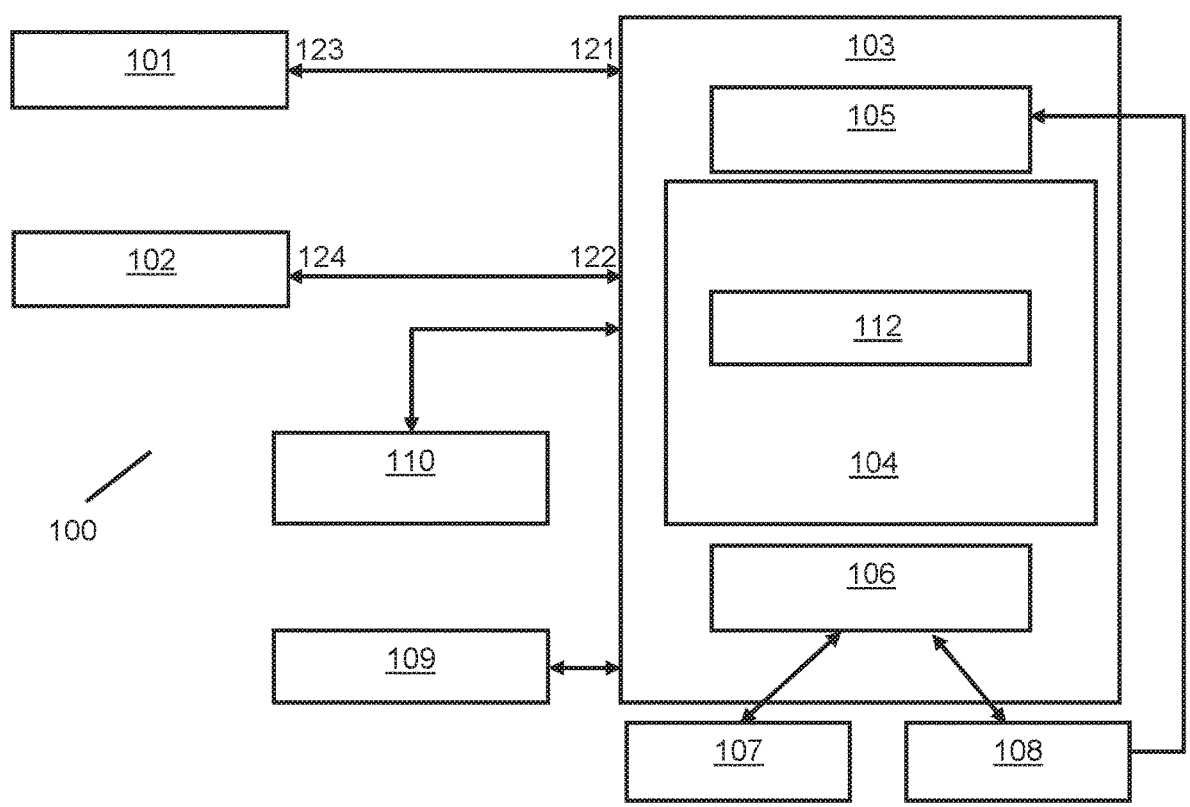
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "providing", "selecting", "feeding", "outputting", "increasing", "decreasing", "assigning", "updating" or the like, refer to the action(s) and/or process(es) of a processor that manipulates and/or transforms data into other data, said data represented as physical, such as electronic, quantities and/or said data representing the physical objects. The term "processor" covers any computing unit or electronic unit with data processing circuitry that may perform tasks based on instructions stored in a memory, such as a computer, a server, a chip, a hardware processor, etc. It encompasses a single processor or multiple processors, which may be located in the same geographical zone or may, at least partially, be located in different zones and may be able to communicate together.

The terms "non-transitory memory" and "non-transitory medium" used herein should be expansively construed to cover any volatile or non-volatile computer memory suitable to the presently disclosed subject matter.

The term "specimen" used in this specification should be broadly construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two-phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least some of the suspected locations are more thoroughly analyzed with relatively high resolution. In some cases, both phases can be implemented by the same inspection tool, and, in some other cases, these two phases are implemented by different inspection tools.

The term "defect" used in this specification should be expansively construed to cover any kind of abnormality or undesirable feature formed on or within a specimen.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the computer for executing one or more methods of the invention.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. semiconductor specimen such as a wafer and/or parts thereof) as part of the specimen fabrication process. The illustrated examination system 100 comprises computer-based system 103 capable of automatically determining metrology-related and/or defect-related information using images of one or more specimens. System 103 can be operatively connected to one or more low-resolution examination tools 101 and/or one or more high-resolution examination tools 102 and/or other examination tools. The examination tools are configured to capture images of specimens and/or to review the captured image(s) and/or to enable or provide measurements related to the captured image(s). System 103 can be further operatively connected to CAD (computer aided design) server 110 and/or to data repository 109.

System 103 includes a processor and memory circuitry (PMC) 104. PMC 104 is configured to provide processing necessary for operating system 103, as further detailed in the various embodiments described hereinafter, and comprises a processor (not shown separately) and a memory (not shown separately). In FIG. 1, PMC 104 is operatively connected to a hardware-based input interface 105 and to a hardware-based output interface 106.

The processor of PMC 104 can be configured to execute several functional modules in accordance with computer-readable instructions implemented on a non-transitory computer-readable memory comprised in the PMC. Such functional modules are referred to hereinafter as included in the PMC. Functional modules comprised in PMC 104 include at least one algorithmic module 112 (or a plurality of algorithmic modules 112). According to some embodiments, the algorithmic module 112 includes a list of instructions stored in a non-transitory memory, the instructions being such that, when executed by a PMC (such as PMC 104), cause the PMC to provide, based on an image of a semiconductor specimen received as an input, application-related data (such as data representative of one or more defects in the image). Examples of data representative of one or more defects include e.g. location of the one or more defects, class of the one or more defects, etc. The instructions encode operation of a model, such as machine learning algorithm, and/or a sequence of computer vision instructions (e.g. edge detection, etc.), and/or image processing instructions, and/or a deep neural network, or other adapted models. This is not limitative and in some embodiments, the algorithmic module is implemented using hardware components, e.g. FPGA, which is configured to execute operation of the model (without requiring storage of the instructions).

As mentioned above, in some embodiments, the algorithmic module 112 can include a deep neural network (DNN), comprising layers organized in accordance with the respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture or otherwise. Optionally, at least some of the layers can be organized in a plurality of DNN sub-networks. Each layer of the ML network can include multiple basic computational elements (CE), typically referred to in the art as dimensions, neurons, or nodes.

Generally, computational elements of a given layer can be connected with Ces of a preceding layer and/or a subsequent layer. Each connection between a CE of a preceding layer and a CE of a subsequent layer is associated with a weighting value. A given CE can receive inputs from Ces of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to Ces of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and Ces.

The weighting and/or threshold values of the DNN 112 can be initially selected prior to training, and can be further iteratively adjusted or modified during training to achieve an optimal set of weighting and/or threshold values in a trained ML network. After each iteration, a difference (also called loss function) can be determined between the actual output produced by ML network and the target output associated with the respective training set of data. The difference can be referred to as an error value. Training can be determined to be complete when a cost or loss function indicative of the error value is less than a predetermined value, or when a limited change in performance between iterations is achieved. Optionally, at least some of the ML subnetworks (if any) can be trained separately, prior to training the entire ML network.

A set of ML network input data used to adjust the weights/thresholds of a deep neural network is referred to hereinafter as a training set.

System 103 is configured to receive, via input interface 105, input data which can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g. captured images, images derived from the captured images, simulated images, synthetic images, etc.) and associated scalar data (e.g. metadata, hand-crafted attributes, etc.). It is further noted that image data can include data related to a layer of interest and/or to one or more other layers of the specimen.

Upon processing the input data (e.g. low-resolution image data and/or high-resolution image data, optionally together with other data as, for example, design data, synthetic data, etc.) system 103 can send, via output interface 106, the results (e.g. instruction-related data 123 and/or 124) to any of the examination tool(s), store the results (e.g. defect attributes, defect classification, etc.) in storage system 107, render the results via GUI 108 and/or send to an external system (e.g. to Yield Management System (YMS) of a FAB). GUI 108 can be further configured to enable user-specified inputs related to system 103.

By way of non-limiting example, a specimen can be examined by one or more low-resolution examination machines 101 (e.g. an optical inspection system, low-resolution SEM, etc.). The resulting data (low-resolution image data 121), informative of low-resolution images of the specimen, can be transmitted—directly or via one or more intermediate systems—to system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (high-resolution image data 122) informative of high-resolution images of the specimen can be transmitted—directly or via one or more intermediate systems—to system 103.

It is noted that image data can be received and processed together with metadata (e.g. pixel size, text description of defect type, parameters of image capturing process, etc.) associated therewith.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines, and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some of examination tools 101 and/or 102, data repositories 109, storage system 107 and/or GUI 108 can be external to the examination system 100 and operate in data communication with system 103 via input interface 105 and output interface 106. System 103 can be implemented as stand-alone computer(s) to be used in conjunction with the examination tools. Alternatively, the respective functions of the system can, at least partly, be integrated with one or more examination tools.

Figure 2:
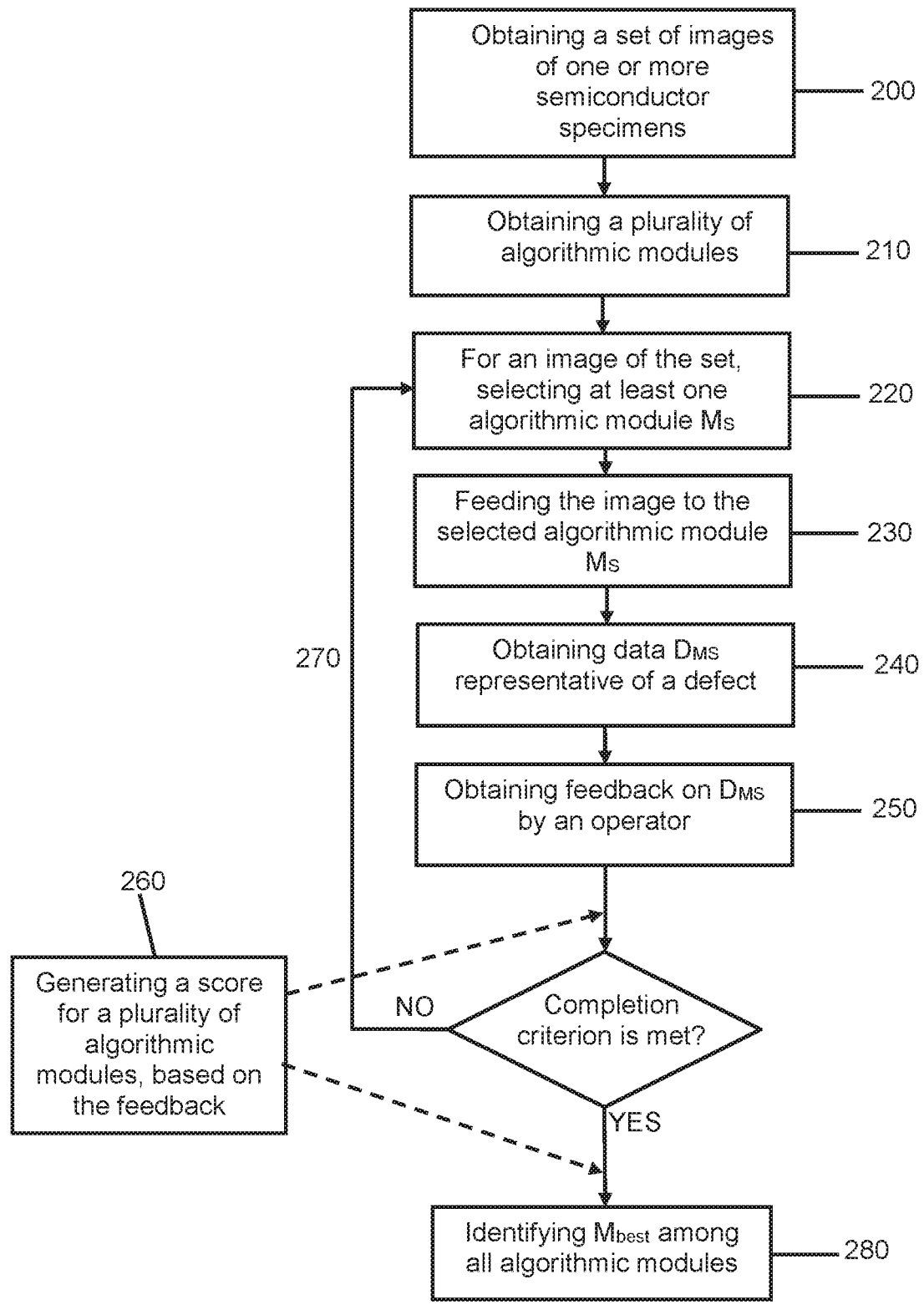
FIG. 2 illustrates a method of selecting at least one algorithmic module among a plurality of algorithmic modules, identified as the most adapted to provide data representative of one or more defects in a set of image.

Attention is now drawn to FIG. 2. A method includes obtaining (200) a set of images of one or more semiconductor specimens. The method includes obtaining (210) a plurality of algorithmic modules $M_1$ to $M_N$. Various examples of algorithmic modules have already been provided beforehand (see e.g. reference 112 in FIG. 1 which is an example of an algorithmic module).

Building of the algorithmic module can rely on various methods. According to some embodiments, the algorithmic module can include a machine learning algorithm/deep neural network, which has been trained beforehand to perform a task (e.g. defect detection, defect classification, defect segmentation, defect grading, etc.) based on a training set of images of semiconductor specimens. This is however not limitative.

Figure 2A:
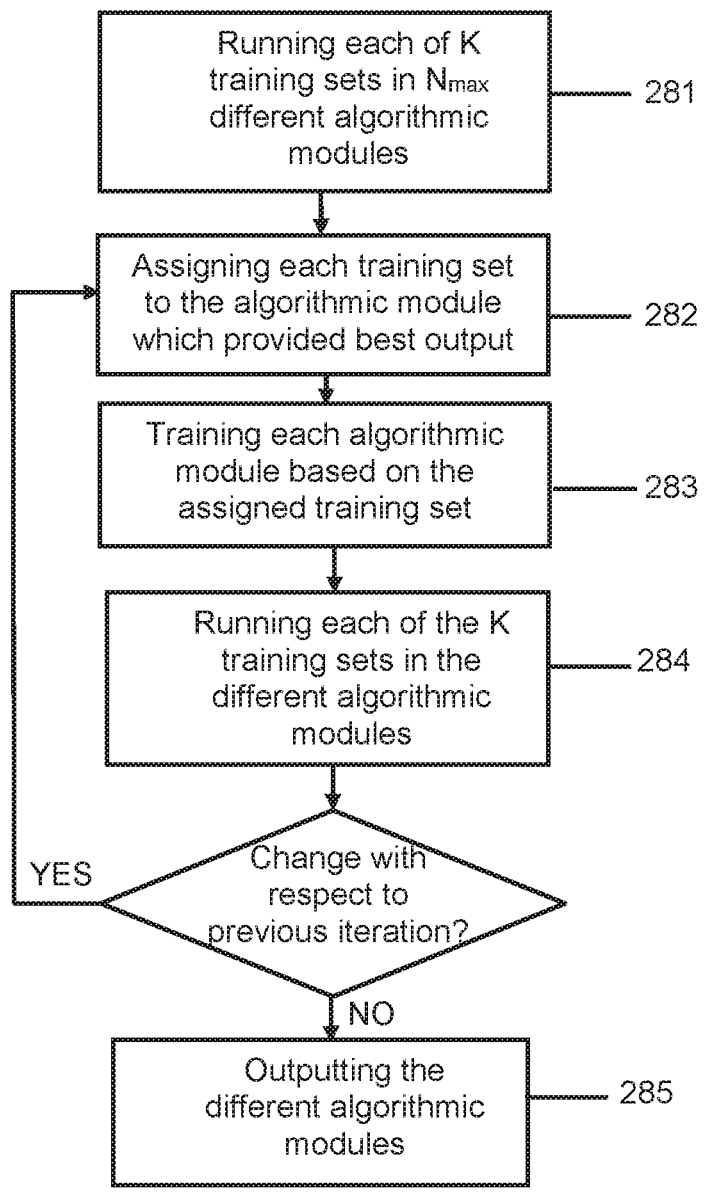
FIG. 2A illustrates a method of building a plurality of algorithmic modules based on a plurality of training sets of images.

FIG. 2A describes a non-limitative example of a method of building a plurality of algorithmic modules based on one or more training sets of images of semiconductor specimens. Assume it is intended to build $N_{max}$ different algorithmic modules (with $N_{max}$ a number provided e.g. by an operator) based on K different training sets of images (with $K \geq N_{max}$). The method can include (281) running all K different training sets through all $N_{max}$ different algorithmic modules. At the first iteration, the algorithmic modules are not optimized and include e.g. random values for the weights of their models. Each model can include e.g. a machine learning algorithm that needs to be trained, or computer vision block(s) and/or image processing block(s) which include parameters to be tuned. As mentioned above, this is not limitative and other models can be used. Each algorithmic module provides data representative of defects for each image of the training set. Each training set is assigned (282) to the algorithmic module which has provided the best output for this training set (this can be determined by computing e.g. a loss function between the expected output provided e.g. by a label of an operator, and the real output provided by the algorithmic module). If an algorithmic module has not been assigned with any training set, then it can be deleted, or can be randomly assigned with one or more of the less successful training sets.

Then, each algorithmic module is trained based on the training sets that were assigned to it. Training of the algorithmic module depends on the nature of the model that it stores. For example, if the model includes a deep neural network, training can include e.g. computing a loss function and performing backpropagation. Once each algorithmic module has been trained, the method can include running (284) all training sets through all different trained algorithmic modules. If the best output for each training set is provided by the algorithmic module to which it has been assigned at the last iteration, the method ends, and the trained algorithmic modules can be output (operation 285). If a change occurs, the method can include repeating operations 282, 283 and 284.

Reverting to the method of FIG. 2, an objective of the method is to identify, among the plurality of algorithmic modules, one or more algorithmic modules which are the most adapted for providing data representative of defects in the set of images. The set of images obtained at 200 (for which a relevant algorithmic module has to be selected) is generally different from the training sets of images (obtained at 281) that have been used for training the different algorithmic modules. Therefore, since the algorithmic modules have not been trained specifically based on this set of images, there is a need to identify which algorithmic module(s) is the most adapted for this set of images, and possibly to retrain one or more of the algorithmic module(s), as explained hereinafter.

Figure 2B:
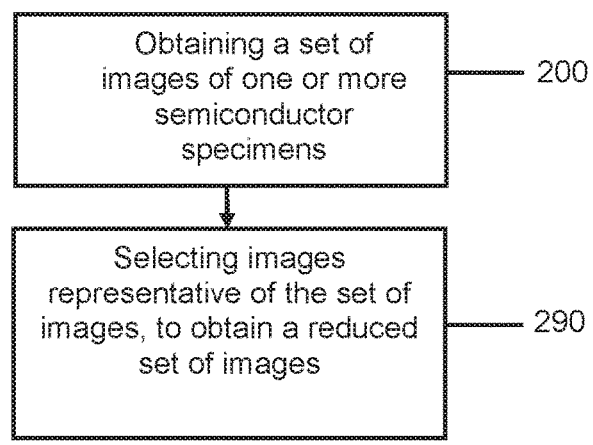
FIG. 2B illustrates a method of selecting a subset of images representative of a set of images.

According to some embodiments, and as shown in FIG. 2B, the set of images can be reduced (operation 290) to a reduced set of images, on which the method of FIG. 2 is applied.

The reduced set of images can be selected to include images which best represent the set of images. For example, it is not optimal to use, all the time in the method of FIG. 2, similar images. A random selection of the reduced set of images can provide suboptimal results. For example, if 1000 images of the set of images include 950 images of a first class of defects, and 50 images of a second class of defects, a random selection of 100 images for the reduced set of images would include 95 images of the first class of defects and 5 images of the second class of defects, which yields a too small number of the second class of defects for optimal selection of the algorithmic module in the method of FIG. 2. This problem is referred as un-balanced dataset.

As explained hereinafter, the images of the reduced set of images are fed to one or more algorithmic modules which provide data representative of defects in these images, and supervised feedback (e.g. annotation) is provided, e.g. by a human, on output data provided by the algorithmic modules. According to some embodiments, the images of the reduced set of images are selected in a form that optimizes diversity and robustness of the resulting annotated data set (i.e. by obtaining a sufficient number of images from each type of images).

Therefore, operation 290 can include selecting a limited number of images (which will constitute the reduced set of images) among the set of images which represents, as best as possible, the domain and/or variety of the set of images. This selection can be based on image data (pixel values, etc.), and in some embodiments, also on any meta-data associated with the images.

Classification algorithms such as K-means clustering, LDA (Linear discriminant analysis), Markov, Random Field, Bayesian Information criterion (BIC), Hierarchical clustering (GDL-U, AGDL), decision trees, ICA (Independent Component Analysis), PCA (Principal Components Analysis), FPS (Farthest Points Sampling), etc. can be used to perform operation 290. In particular, unsupervised algorithms can be used, in which labelling from an operator is not required. This is however not limitative and other algorithms can be used. Operation 290 can include for example clustering the set of images into a plurality of clusters, and selecting a fraction of images from each cluster.

According to some embodiments, selection of the images can rely on additional information (features), such as data representative of the defects in the images. This additional information can be used to select the images for the reduced set of images. Assume that the images are fed to one or more of the plurality of algorithmic modules obtained at operation 210. Each algorithmic module can output data representative of defects (e.g. location, class, etc.) in each image. This data can be used as a feature for clustering the images and selecting a reduced set of images representative of the set of images.

Reverting to the method of FIG. 2, the method can include, for each image of the set of images (or of the reduced set of images if the method of FIG. 2B has been used), selecting (220) a fraction of the plurality of algorithmic modules. This fraction includes at least one algorithmic module $M_S$ (or more). Various embodiments of selecting $M_S$ will be provided hereinafter.

The method can further include feeding (operation 230) the image to the algorithmic module $M_S$ to obtain data $D_{MS}$ representative of one or more defects in the image. If a plurality of algorithmic modules $M_S$ have been selected at 220, then the image is fed to each of these algorithmic modules, and each algorithmic module outputs corresponding data $D_{MS}$.

As mentioned above, $D_{MS}$ can include e.g. location of defects in the image, identification of a class of the defects, etc.

$D_{MS}$, or data representative thereof, can be output to a human, using e.g. a display. For example, if $D_{MS}$ includes location of defects in the image, a computerized image including e.g. ellipses encircling detected location of the defect in the original image, can be computed and output to the operator. If $D_{MS}$ includes class of defects, then a class can be displayed on an image of the corresponding defect. This is not limitative and the output could be provided in any adapted way.

The method includes obtaining (230) a supervised feedback (that is to say an external feedback, e.g. from a human) regarding data $D_{MS}$ provided by each algorithmic module $M_S$. In particular, the feedback can indicate to what extent $D_{MS}$ is considered as right based on the knowledge of the human. In some embodiments, the feedback can indicate that $D_{MS}$ is fully incorrect, or that $D_{MS}$ is fully correct, or that $D_{MS}$ is only partially correct.

Figure 3:
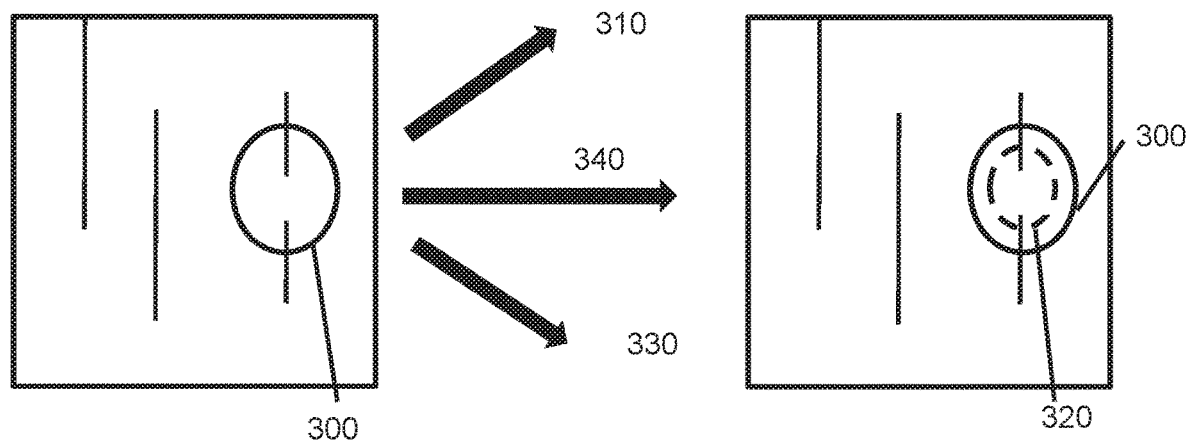
FIG. 3 illustrates a non-limitative example of a supervised feedback provided by a human (annotation) with respect to an output of a selected algorithmic module.

An example of feedback is illustrated in FIG. 3. Assume that an image has been fed to an algorithmic module $M_S$ (which has been selected among the plurality of algorithmic modules for this image) which provides an ellipse 300 as an estimation of the location of a defect (data $D_{MS}$). According to some embodiments, the feedback of the operator can include:

Validating the proposal provided by the algorithmic module $M_S$ (310);

Improving the proposed provided by the algorithmic module $M_S$ (the operator provides an ellipse 320 which is more focused on the defect than the ellipse 300 provided by the algorithmic module $M_S$). In other words, the output of the algorithmic module $M_S$ was only partially correct (340);

Rejecting the proposal provided by the algorithmic module $M_S$ (330).

According to some embodiments, an intersection over union can be calculated between the ellipse provided by the algorithmic module, and the ellipse provided by the human, thereby allowing identifying whether the software was fully correct (310), fully wrong (330), or only partially correct (340).

The feedback as depicted in FIG. 3 is not limitative. According to other embodiments, the feedback is not necessarily provided in a graphical form but can be provided e.g. in a textual form (for example, the human provides coordinates of the defect and/or classification of the defect).

Based on this supervised feedback, the method can include generating (operation 260) a score for a plurality of algorithmic modules.

In some embodiments, operation 260 is performed each time an algorithmic module $M_S$ has been selected and has provided an output which can be evaluated with respect to the supervised feedback. According to some embodiments, if the supervised feedback indicates that $D_{MS}$ provided by $M_S$ was correct, then the score associated with $M_S$ can be increased with respect to a score previously associated with $M_S$ (the previous score can be obtained from past iterations, or at the first iteration can be predefined e.g. by an operator). Similarly, if the supervised feedback rejects $D_{MS}$, then the score associated with $M_S$ can be decreased with respect to a score previously associated with $M_S$. Modification of the score of $M_S$ can influence the score associated with each of the other algorithmic modules (e.g. to maintain a total score equal to a fixed sum, for example equal to one).

In other embodiments, operation 260 is performed after the completion criterion has been met, based on all feedbacks received over all iterations 270 of the method. A score is computed for each algorithmic module based on the number of times it has been selected and based on the supervised feedback(s) obtained for each algorithmic module (indicative of the number of times each algorithmic module has provided a correct output).

If a completion criterion is not met, the method can revert to operation 220, in which a next image of the set of images (or of the reduced set of images) is obtained, and an algorithmic module $M_S$ is selected for this new image. Operations 230 to 260 are repeated similarly for this new image. Generally, for at least one next image selected during subsequent iterations, the selected algorithmic module $M_S$ is different (thereby allowing testing more than one algorithmic module).

The completion criterion is met e.g. when a sufficient number of supervised feedbacks has been obtained, or when a sufficient number of images has been processed, etc.

If the completion criterion is met, the method can include identifying (operation 280) at least one algorithmic module $M_{best}$, as the most adapted among the plurality of algorithmic modules for providing data representative of defects in the set of images. An output indicative of the algorithmic module $M_{best}$ can be provided. According to some embodiments, the method of FIG. 2 is performed on the reduced set of images, and $M_{best}$ has been identified as the most adapted among the plurality of algorithmic modules for providing data representative of defects in the set of images, since the reduced set of images is representative of the set of images. Selection of $M_{best}$ can be based on the scores associated with the different algorithmic modules. For example, $M_{best}$ is selected as the algorithmic module which has the best score (e.g. highest score).

According to some embodiments, the supervised feedback can be used to retrain one or more of the algorithmic modules. According to some embodiments, the retraining can be performed before $M_{best}$ has been selected (e.g. during the iterations 270), and according to some other embodiments, the retraining can be performed after $M_{best}$ has been selected.

For example, assume that $M_{best}$ has been selected after a group of P images has been processed according to the method of FIG. 2. The labels provided by a human on a plurality of the P images can be used to retrain algorithmic module $M_{best}$. In some embodiments, assume $M_{best}$ is an algorithmic module which includes a model which can be represented by a plurality of layers (deep neural network), then only a fraction of the layers is retrained, and the other layers are frozen (transfer learning method).

According to some embodiments, a subset of the P images for which a supervised feedback has been obtained, is used for retraining (the label used in the loss function can correspond to the supervised feedback), and another subset of the P images is used to validate the trained algorithmic modules.

Figure 4:
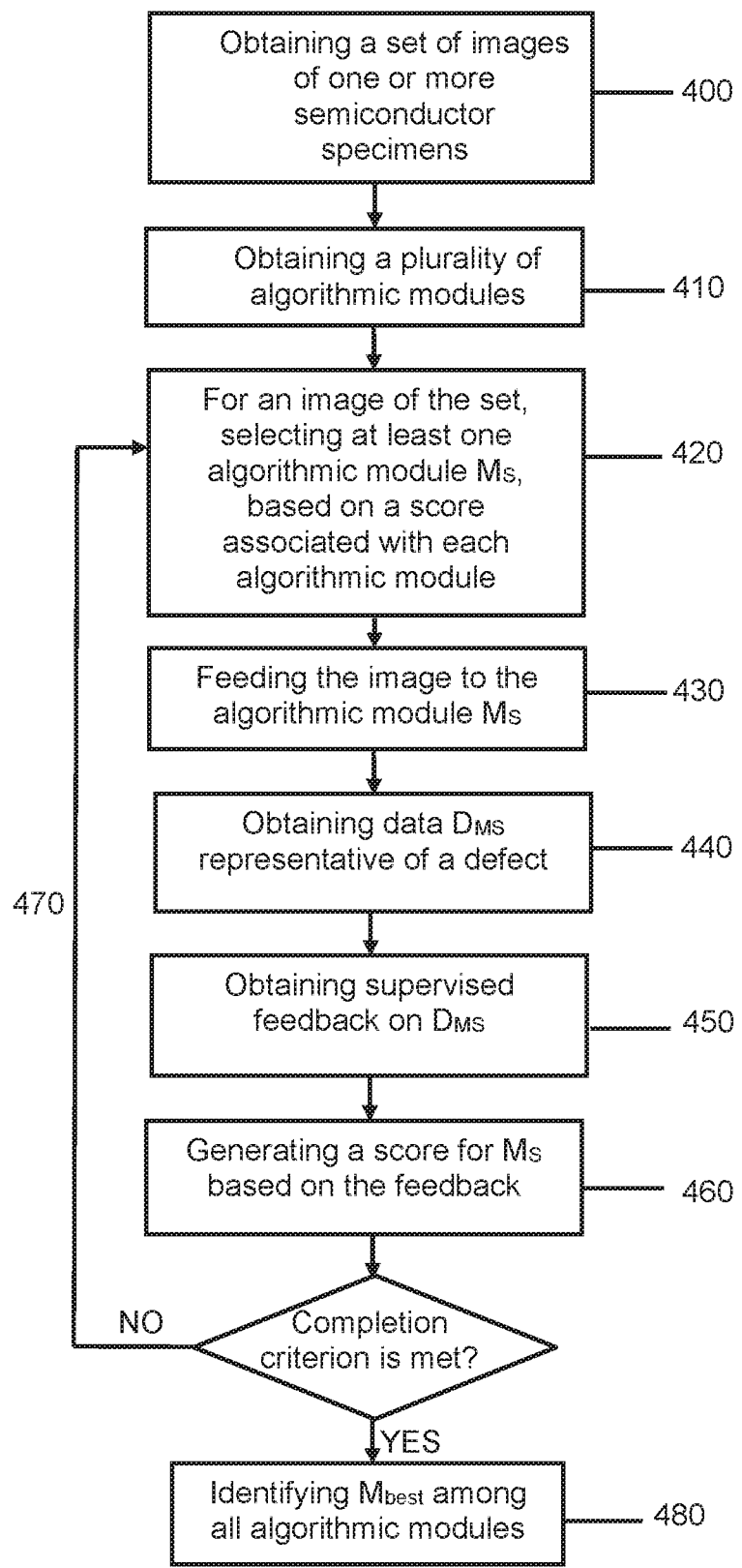
FIG. 4 illustrates a possible embodiment of the method of FIG. 2.

Attention is now drawn to FIG. 4, which describes a possible implementation of the method of FIG. 2.

The method includes obtaining (400) a set of images of one or more semiconductor specimens. This operation is similar to operation 200. The method includes obtaining (410) a plurality of algorithmic modules. This operation is similar to operation 210.

The method includes (operation 420), for an image of the set of images, selecting at least one algorithmic module $M_S$, based on a score associated with each algorithmic module. Each score can be viewed as a probability that the algorithmic module needs to be selected.

At the initialization of the method, all scores can be set as equal (this is however not mandatory). If N algorithmic modules are present, then, for example for all algorithmic modules, the score is set equal to 1/N.

As mentioned above, selection of the algorithmic module $M_S$ can include performing a random selection based on the scores associated with the algorithmic modules. The probability of selecting an algorithmic module can be equal to the relative score of that algorithmic module with respect to the rest of available algorithmic modules. For example, a random number generator can be used to generate a random number, and an algorithmic module $M_S$ is selected based on the scores of the algorithmic modules and the random number (this kind of random selection is called categorical distribution, see e.g. https://en.wikipedia.org/wiki/categorical_distribution). At the initialization of the method, since all algorithmic modules have the same score, each algorithmic module has the same probability to be selected. When operation 420 is repeated during subsequent iterations, the scores associated with the algorithmic modules evolve and do not all share the same value. Therefore, an algorithmic module with a higher score has a higher probability to be selected at operation 420. However, this does not mean that the algorithmic module with the highest score will be always selected, but only that the random selection of the algorithmic module is influenced by the score associated with each algorithmic module.

According to some embodiments, more than one algorithmic module $M_S$ can be selected at operation 420. The maximal number of algorithmic modules $M_S$ to be selected depends e.g. on processing capabilities.

The method further includes feeding the image to the algorithmic module $M_S$ (operation 430, similar to 230), obtaining data $D_{MS}$ representative of one or more defects (operation 440, similar to 240), and obtaining a supervised feedback on $D_{MS}$ (operation 450, similar to 250).

According to some embodiments, the method can include selecting only a subset of $D_{MS}$ to be output to a human for obtaining a supervised feedback. Indeed, size of $D_{MS}$ can be large, and therefore it can be recommended to assist feedback by the human by reducing the size of $D_{MS}$ output to him. Selection of a subset of $D_{MS}$ can rely on various techniques. According to some embodiments, when an algorithmic module provides data $D_{MS}$, it provides also a level of confidence associated with its prediction. Selection of a subset of $D_{MS}$ can include selecting only data for which a level of confidence is above a threshold. According to some embodiments, if a plurality of algorithmic modules has been selected at 420, selection of a subset of $D_{MS}$ can include selecting only $D_{MS}$ provided by algorithmic modules for which a score is above a threshold. According to some embodiments, if a plurality of algorithmic modules has been selected at 420, selection of a subset of $D_{MS}$ can rely on a majority vote among the output of the different algorithmic modules.

A score is generated for $M_S$ (operation 460) based on the supervised feedback. According to some embodiments, the scores of all other algorithmic modules are also updated based on the supervised feedback, as explained hereinafter.

If the supervised feedback indicates that the algorithmic module $M_S$ has provided data $D_{MS}$ which is valid, then the score $P_{MS}$ associated with the algorithmic module $M_S$ can be increased with respect to the score previously associated with the algorithmic module $M_S$. In other words, since the algorithmic module $M_S$ has provided a valid prediction, it is "rewarded" by increasing its probability to be selected in subsequent iterations of the method.

If the supervised feedback indicates that the algorithmic module $M_S$ has provided data $D_{MS}$ which is not valid, then the score $P_{MS}$ associated with the algorithmic module $M_S$ can be decreased with respect to the score previously associated with the algorithmic module $M_S$. In other words, since the algorithmic module $M_S$ has provided a wrong prediction, it is "blamed" by decreasing its probability to be selected in subsequent iterations of the method.

If the supervised feedback indicates that the algorithmic module $M_S$ has provided data $D_{MS}$ which is only partially correct, then the score $P_{MS}$ associated with the algorithmic module $M_S$ can be only partially increased (e.g. a function can define the level of increase depending on the level of validity of the output of the algorithmic module) with respect to the score previously associated with the algorithmic module $M_S$.

Therefore, the supervised feedback dynamically changes the probability that an algorithmic module will be selected at the next iteration.

Update of the score associated with the algorithmic module $M_S$ can impact the score associated with other algorithmic modules, in order to keep a sum of all scores which is e.g. equal to one.

For example, the following equations can be used ($P_{Mg}$ is a score associated with algorithmic module $M_i$):

$P_{M_S} = P_{M_S} - \varepsilon$ (if algorithmic module $M_S$ was not correct)
$P_{M_S} = P_{M_S} + \varepsilon$ (if algorithmic module $M_S$ was correct)
$P_{M_S} = P_{M_S} + \alpha\varepsilon$ (if algorithmic module $M_S$ was only partially correct, with $\alpha$ a parameter depending on the level of validity of the output of the algorithmic module $M_S$)

$$P_{M_j} = \frac{P_{M_j}}{\sum_{1}^{N} P_{M_i}}$$

(normalization of all scores for all algorithmic modules $M_j$) Increase of the score associated with $M_S$ can induce a decrease of the score associated with all other algorithmic modules (in order to keep a sum of all scores equal to one). Decrease of the score associated with $M_S$ can induce an increase of the score associated with all other algorithmic modules (in order to keep a sum of all scores equal to one).

If a completion criterion is not met, the method can revert to operation 420, in which a next image of the set of images (or of the reduced set of images) is provided, and an algorithmic module $M_S$ is selected for this next image. Operations 430 to 460 are repeated similarly for this next image. Examples of the completion criterion have been provided above.

If the completion criterion is met, the method can include identifying (operation 480) at least one algorithmic module $M_{best}$, as the most adapted among the plurality algorithmic modules for providing data representative of defects in the set of images. An output indicative of the algorithmic module $M_{best}$ can be provided. Selection of $M_{best}$ can be performed based on the scores associated with the algorithmic modules. For example, the algorithmic module which is associated with the highest score (after several iterations 470) can be selected as $M_{best}$.

Figure 5:
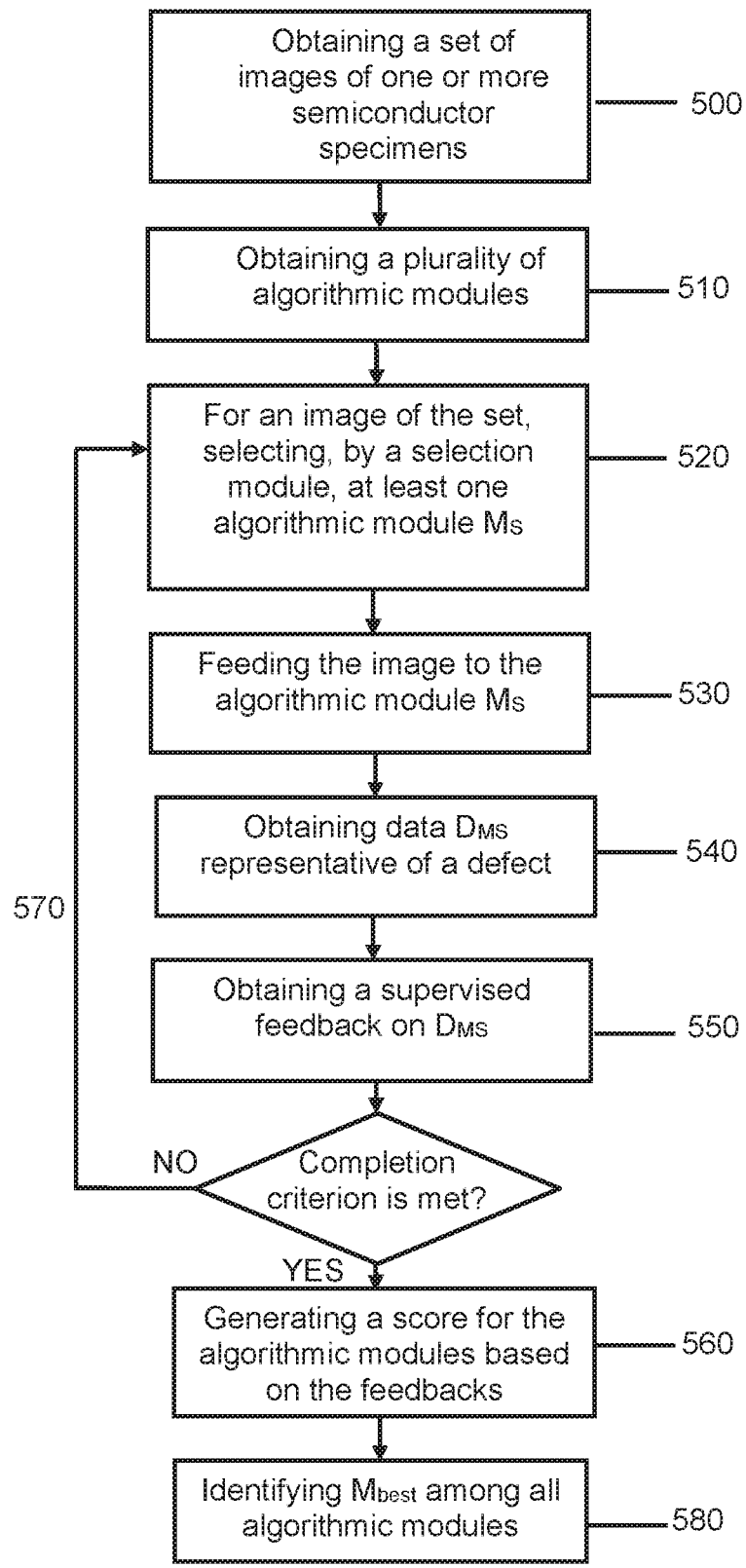
FIG. 5 illustrates another possible embodiment of the method of FIG. 2, which relies on a selection module.

Attention is now drawn to FIG. 5, which describes another possible implementation of the method of FIG. 2.

The method includes operations 500 and 510 which are similar to operations 200 and 210 and are not described again.

The method includes (operation 520), for an image of the set of images, selecting at least one algorithmic module $M_S$. In this embodiment, a selection module is used to select $M_S$. The selection module can include a list of instructions stored in a non-transitory memory, the instructions being such that, when executed by a PMC, cause the PMC to execute a model allowing selection of an algorithmic module $M_S$. In some embodiments, the selection module implements a machine learning algorithm, such as α a deep neural network. The selection module is trained to predict which algorithmic module is the most adapted to provide data $D_{MS}$ representative of a defect for the current image. Training of the selection module will be discussed with reference to FIG. 6.

According to some embodiments, the selection module provides a probability vector $P'=[P'_1, \ldots, P'_N]$ of size N (N is the number of different algorithmic modules). Each algorithmic module is assigned a probability by the selection module, which represents the probability that it is adapted to provide data $D_{MS}$ representative of a defect of the current image. $M_S$ can be selected as the algorithmic module which has the highest probability. In some embodiments, more than one algorithmic module $M_S$ can be selected, which can correspond to the algorithmic modules assigned with the highest probabilities.

The method further includes operation 530 (feeding the image to each of the selected algorithmic module $M_S$, similarly to operation 230), operation 540 (obtaining, by each algorithmic module $M_S$, data $D_{MS}$ representative of one or more defects in the image, similarly to operation 240), and operation 550 (obtaining a supervised feedback on $D_{MS}$, similarly to operation 250).

If a convergence criterion is not met, the method can revert to operation 520, in which a new image of the set of images (or of the reduced set of images) is provided, and an algorithmic module $M_S$ is selected for this new image.

Operations 530 to 550 are repeated similarly for this new image. Examples of the convergence criterion have been provided above.

If the convergence criterion is met, the method can include generating (operation 560) a score for each algorithmic module, based on the supervised feedbacks. According to some embodiments, the score of an algorithmic module can be representative of a ratio between the number of positive feedbacks (e.g. the feedback indicated that the output of the algorithmic module was fully correct, or at least partially correct—the corresponding number can be higher for fully correct feedbacks than for partially correct feedbacks) and the number of times the algorithmic module has been selected. This ratio represents the percentage of success of the algorithmic module. This computation is not limited and other formulas can be used for the score.

In other embodiments, the score can be generated for the selected algorithmic module $M_S$ each time operation 550 is executed (this is not visible in FIG. 5). The score can be generated as a ratio between the number of positive feedbacks obtained for $M_S$ (up to the current iteration) and the number of times $M_S$ has been selected (up to the current iteration).

According to some embodiments, one or more algorithmic modules which have not been selected (or which have been selected a number of times less than a threshold) can be identified and tested. As mentioned above, at operation 520, each algorithmic module is assigned with a probability by the selection module, and only the algorithmic module(s) with the highest probability is selected. An aggregated probability can be computed for each algorithmic module over all iterations 570, and, among the algorithmic modules which have not been selected at all or are below a threshold, the algorithmic module with the highest aggregated probability can be selected and tested, using images of the set of images. A score can be generated for this algorithmic module, similarly to as described above. Therefore, when selecting $M_{best}$, this algorithmic module will also be considered.

The method can further include identifying (operation 580) at least one algorithmic module $M_{best}$, as the most adapted among the plurality of algorithmic modules for providing data representative of defects in the set of images. An output indicative of the algorithmic module $M_{best}$ can be provided. $M_{best}$ can be selected as the algorithmic module with the highest score. In some embodiments, other rules can be taken into account to select $M_{best}$. For example, to avoid a situation in which an algorithmic module has been selected once and has been validated by the feedback (thereby leading to a 100% rate of success), a rule can be set that an algorithmic module can be selected only if it has been selected a number of times which is over a threshold. Other rules can be set to select $M_{best}$.

According to some embodiments, the supervised feedback can be used to influence future selection of the algorithmic module $M_S$. In particular, the output of the selection module (probability vector P') in future selection can be weighted by a weighting vector $V=[V_1; \ldots ; V_N]$ depending on the supervised feedback. Assume that an algorithmic module $M_i$ has been selected, and that the supervised feedback indicates that the output of the algorithmic module $M_i$ is not valid. Then the weighting vector V can be selected so that coefficient $V_i$ is less than one, thereby reducing the probability assigned by the selection module to this algorithmic module $M_i$. The other coefficient $V_j$ (j different from i) can remain equal to one.

The supervised feedback can be used in order to identify the algorithmic module $M_{best}$ which is the most adapted for providing data representative of defects in the set of images. Once the algorithmic module $M_{best}$ has been identified, the supervised feedback obtained during the process of identifying of $M_{best}$ can be used to retrain $M_{best}$. In some embodiments, retraining of a given algorithmic module can be performed during the process of identifying $M_{best}$, based on the supervised feedback obtained for this given algorithmic module.

Figure 6:
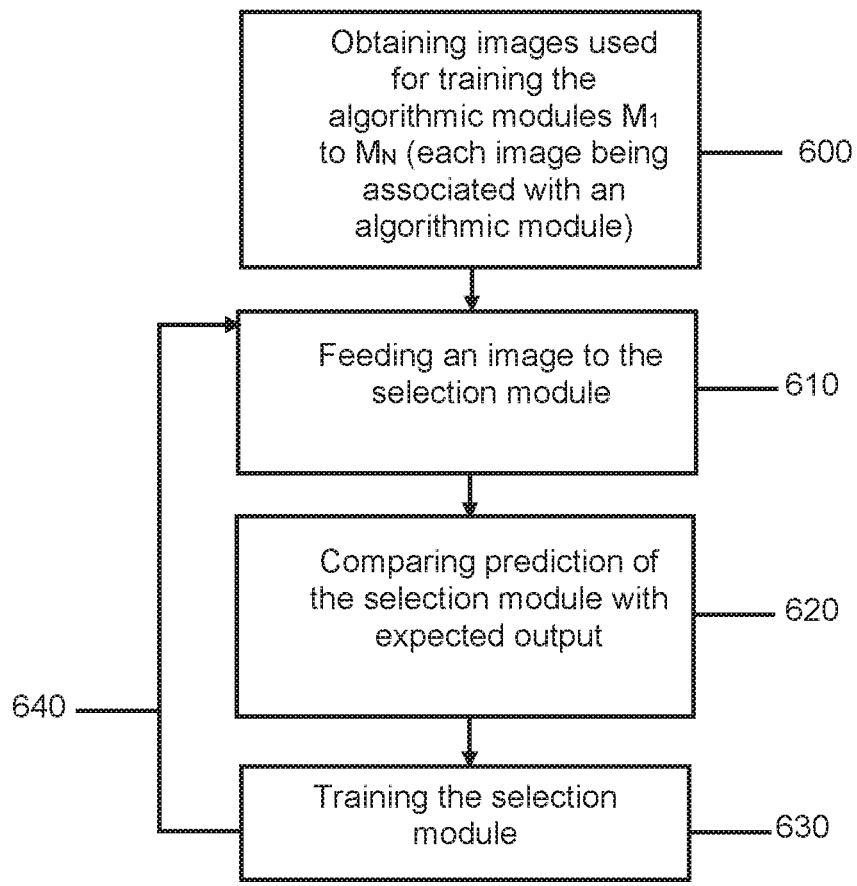
FIG. 6 illustrates a method of training the selection module used in the method of FIG. 5.

Attention is now drawn to FIG. 6, which describes a method of training the selection module. Assume that an algorithmic module has to be selected among N algorithmic modules $M_1$ to $M_N$. As mentioned above with respect to FIG. 2A, according to some embodiments, the algorithmic modules among which an algorithmic module has to be selected, have been trained beforehand using a plurality of training sets of images.

According to some embodiments, the selection module is trained based on the same plurality of training sets of images which have been used for training the different algorithmic modules (see reference 600).

The method includes feeding (operation 610) an image to the selection module which is configured to output a vector $[P_1; \ldots P_N]$ of size N, wherein Pi is the probability that algorithmic module $M_i$ is adapted to provide data representative of one or more defects for this image. The label vector (one hot representation) of each image is of size N:

[1; 0; . . . ; 0] (if the image belongs to a training set which was used to train algorithmic module $M_1$),

[0; 1; . . . ; 0] (if the image belongs to a training set which was used to train algorithmic module $M_2$), etc.

Indeed, it is expected that an algorithmic module will provide the best results for an image used during its training. A loss function is computed between the output of the selection module and the label vector of the image (operation 620), in order to train the selection module (operation 630, using e.g. backpropagation). The method can be repeated for a plurality of images (reference 640).

Figure 7:
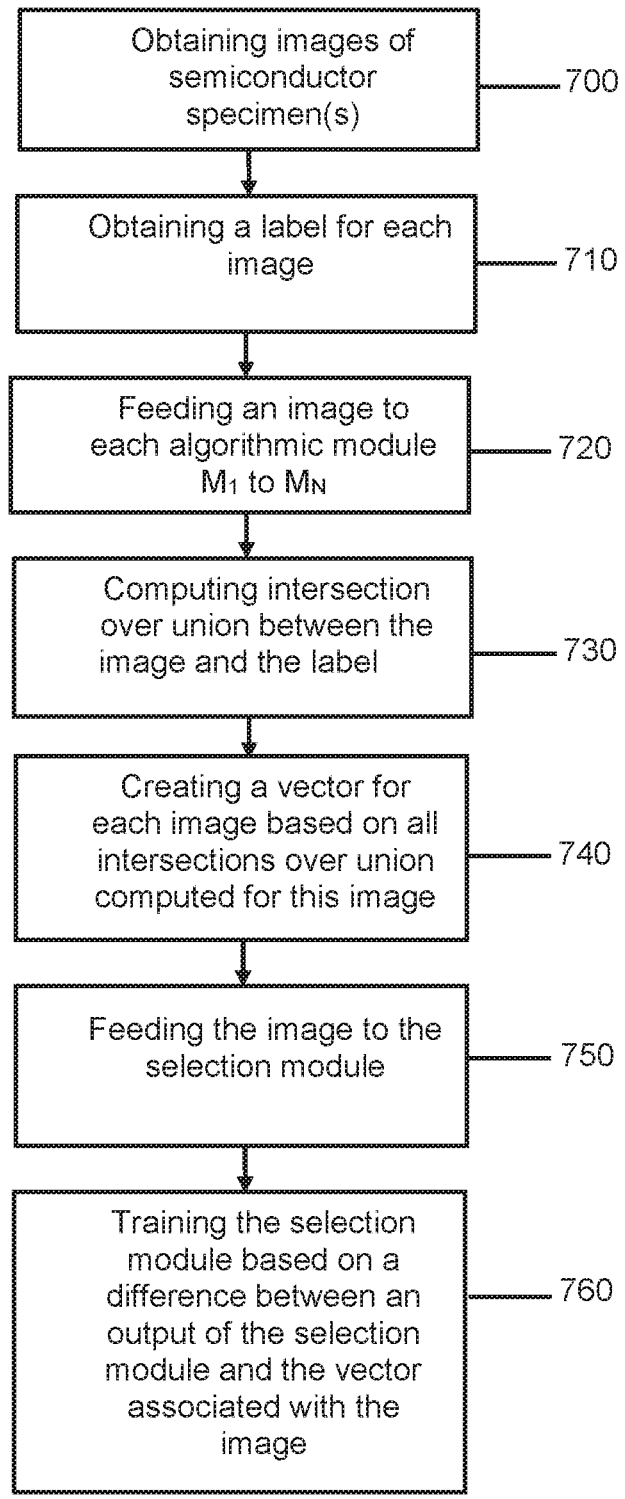
FIG. 7 illustrates another method of training the selection module used in the method of FIG. 5.

Attention is drawn to FIG. 7, which describes another method of training the selection module. In this embodiment, it is possible to use a training set including images which have not been originally used for training the algorithmic modules $M_1$ to $M_N$(operation 700). The method includes obtaining (710) a label for each image of the training set. The label can be provided by an operator. For example, he can provide an estimation of the location of the defects. The method includes feeding (720) each image of the training set to each algorithmic module. Each algorithmic module $M_i$ will provide data $D_{Mi}$ representative of defects in the image. It is possible to compute (operation 730), for each image, an intersection over union between $D_{Mi}$ obtained for the image, and the label provided for this image (this intersection over union represents to what extent the prediction of the algorithmic module was correct). This can be repeated for a plurality of images of the training set. As a consequence, for each image, a vector of size N is obtained (operation 740), which includes, for each algorithmic module, the intersection over union between $D_{Mi}$ obtained for the image and the label provided for this image. The sum of the different values of each vector can be normalized to one. Alternatively, each vector can be represented as a one-hot vector (in which the maximum value of the vector is set to one, and the other values are set to zero).

Training (operation 760) of the selection module can be performed by feeding (operation 750) each image of the training set to the selection module (which will provide an output estimating which algorithmic module is the most adapted for this image), and computing a loss function based on the difference between its output and the vector associated with the image.

Figure 8:
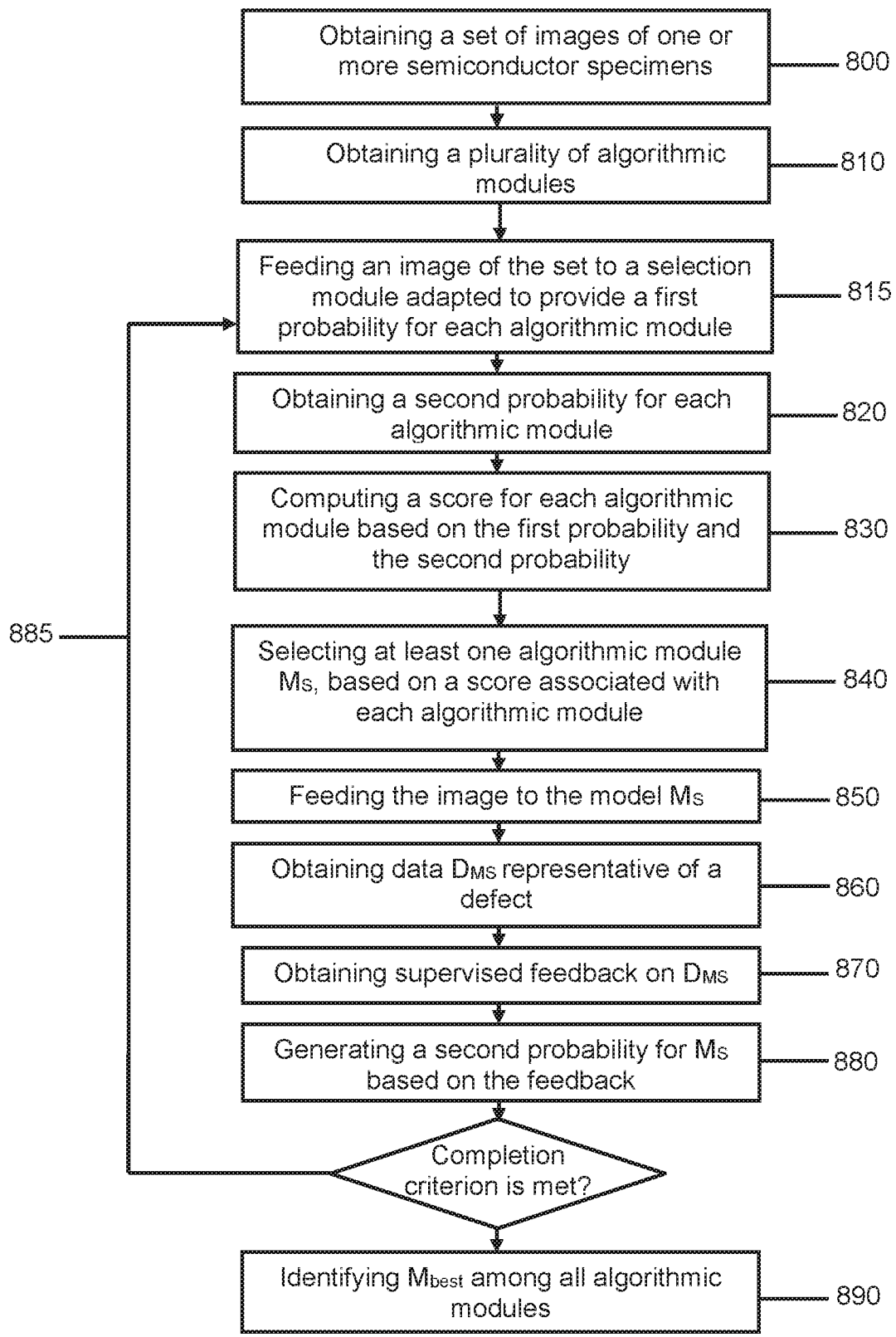
FIG. 8 illustrates another possible embodiment of the method of FIG. 2, which relies on the method of FIG. 4 and the method of FIG. 5.

Attention is now drawn to FIG. 8, which describes a method combining both the methods of FIGS. 4 and 5.

The method includes obtaining (800) a set of images of one or more semiconductor specimens. This operation is similar to operation 200 above. The method includes obtaining (810) a plurality of algorithmic modules $M_1$ to $M_N$. This operation is similar to operation 210 above. The method includes feeding (815) an image of the set of images to a selection module. The selection module is configured to provide, based on the image, a first probability for each algorithmic module of the plurality of algorithmic modules. The first probability is representative of a probability that each algorithmic module is adapted for providing data representative of defects in the image. The selection module is similar to the selection module described in FIG. 5, and can be trained e.g. as described in FIGS. 6 and 7. Since N algorithmic modules are present, the output of the selection module can be represented as a vector $P'=[P'_1; \ldots; P'_N]$, of size N, in which $P'_i$ is the first probability associated with each algorithmic module $M_i$, which is representative of the probability that algorithmic module $M_1$ is relevant for providing data representative of a defect in the image. Generally, the sum of $P'_1$ to $P'_N$ is equal to one (since they represent a probability distribution).

The method includes obtaining (operation 820) a second probability for each algorithmic module. Similarly to the method of FIG. 4, the second probability is, at the first iteration, predefined e.g. by an operator (for example the same second probability 1/N is assigned to each algorithmic module), and evolves over time depending on a supervised feedback. Since N algorithmic modules are present, this second probability can be represented by a vector $P=[P_1; \ldots; P_N]$, of size N. The second probability represents a probability that an algorithmic module should be selected for providing data representative of one or more defects.

A score can be computed (operation 830) for each algorithmic module, by aggregating the first probability and the second probability. The score can be obtained by multiplying P and P'.

Based on the score associated with each algorithmic module, the method includes selecting (operation 840) at least one algorithmic module $M_S$. For example, the algorithmic module with the highest score is selected. If more than one algorithmic module is selected, then the algorithmic modules which have the highest scores can be selected.

The method further includes feeding the image to the selected algorithmic module $M_S$ (operation 850), which outputs (operation 860) data $D_{MS}$ representative of one or more defects.

The method further includes obtaining (870) a supervised feedback on $D_{MS}$. This operation is similar to operation 450 and is not described again.

The supervised feedback is used (operation 880) to generate a second probability associated with the algorithmic module $M_S$.

If the supervised feedback indicates that the algorithmic module $M_S$ has provided data $D_{MS}$ which is valid, then the second probability associated with the algorithmic module $M_S$ can be increased with respect to the second probability previously associated with the algorithmic module $M_S$. In other words, since the algorithmic module $M_S$ has provided a valid prediction, it is "rewarded" by increasing its probability to be selected in subsequent iterations of the method.

If the supervised feedback indicates that the algorithmic module $M_S$ has provided data $D_{MS}$ which is not valid, then the second probability associated with the algorithmic module $M_S$ can be decreased with respect to the second probability previously associated with the algorithmic module $M_S$. In other words, since the algorithmic module $M_S$ has provided an incorrect prediction, it is "blamed" by decreasing its probability to be selected in subsequent iterations of the method.

If the supervised feedback indicates that the algorithmic module $M_S$ has provided data $D_{MS}$ which is only partially correct, then the second probability associated with the algorithmic module $M_S$ can be only partially increased (e.g. a function can define the level of increase, depending on the level of validity of the output of the algorithmic module) with respect to the second probability previously associated with the algorithmic module $M_S$.

Therefore, the supervised feedback dynamically changes the probability that an algorithmic module will be selected at the next iteration.

If a completion criterion is not met, the method can revert to operation 815, in which a next image of the set of images (or of the reduced set of images) is provided, and an algorithmic module $M_S$ is selected for this next image. Operations 820 to 880 are repeated similarly for this next image. Examples of a completion criterion have been provided above.

If the completion criterion is met, the method can include identifying (operation 890) at least one algorithmic module $M_{best}$, as the most adapted among the plurality algorithmic modules for providing data representative of defects in the set of images. An output indicative of the algorithmic module $M_{best}$ can be provided. Selection of $M_{best}$ can be carried out based on the scores associated with the algorithmic modules. For example, the algorithmic module which is associated with the highest score (after several iterations 885) can be selected as $M_{best}$.

In all embodiments described above, once algorithmic module $M_{best}$ has been identified, it can be retrained, using e.g. the supervised feedback provided for a plurality of images of the set of images. In some embodiments, retraining can be carried out at an intermediate stage, before identification of algorithmic module $M_{best}$. In some embodiments, other algorithmic modules (even if they do not correspond to $M_{best}$) can be retrained using the supervised feedback provided for a plurality of images of the set of images.

It is to be noted that the various features described in the various embodiments may be combined according to all possible technical combinations. It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter. Those skilled in the art will readily appreciate that various modifications and changes can be applied to the embodiments of the invention as hereinbefore described without departing from its scope, defined in and by the appended claims.

The invention claimed is:

1. A system of examination of a semiconductor specimen, comprising a processor and memory circuitry (PMC) configured to:
- obtain a set of images of one or more semiconductor specimens,
- obtain a plurality of algorithmic modules, each algorithmic module being configured to provide, based on an image of a semiconductor specimen, data representative of one or more defects in the image,
- (1) for an image of the set of images, select at least one algorithmic module $M_S$ out of the plurality of algorithmic modules,
- (2) feed the image to the at least one algorithmic module $M_S$ to obtain data $D_{MS}$ representative of one or more defects in the image,
- (3) obtain a supervised feedback regarding rightness of data $D_{MS}$ provided by the algorithmic module $M_S$,
- (4) repeat (1) to (3) for a next image of the set of images until a completion criterion is met, wherein an algorithmic module selected at (1) is different for at least two different images of the set of images,
- wherein the system is configured to:
  - generate, based at least on the supervised feedback, a score for each of the plurality of the algorithmic modules, and
  - use scores associated with the algorithmic modules to identify one or more algorithmic modules $M_{best}$ as the most adapted among the plurality of algorithmic modules for providing data representative of one or more defects in the set of images.

2. The system of claim 1, wherein selecting the at least one algorithmic module $M_S$ out of the plurality of algorithmic modules is provided by a selection module trained to select the at least one algorithmic module $M_S$.

3. The system of claim 2, wherein the score generated for an algorithmic module is representative of a ratio between a number of times a positive feedback has been obtained for the algorithmic module and a number of times the algorithmic module has been selected at (1).

4. The system of claim 3, wherein the supervised feedback obtained at (3) impacts subsequent selection of the at least one algorithmic module $M_S$ at (1) by the selection module.

5. The system of claim 1, wherein the PMC is further configured to generate at (3) a score for the algorithmic module $M_S$, which is representative of a probability that the algorithmic module $M_S$ is adapted to provide data representative of one or more defects in the set of images, wherein the score depends at least on the supervised feedback.

6. The system of claim 5, wherein:
- if the supervised feedback validates $D_{MS}$ at (3), the score associated with $M_S$ is increased with respect to a score previously associated with $M_S$;
- if the supervised feedback rejects $D_{MS}$ at (3), the score associated with $M_S$ is decreased with respect to a score previously associated with $M_S$; and
- the at least one algorithmic module $M_{best}$ is associated with a score which is the highest among the plurality of algorithmic modules.

7. The system of claim 1, wherein the PMC is further configured to select at (1) the algorithmic module $M_S$ based at least on a score associated with the algorithmic module $M_S$ and generated based at least on a supervised feedback previously obtained at (3).

8. The system of claim 1, wherein the PMC is further configured to generate a score for each algorithmic module based on:
- a first probability provided by a selection module trained to select the at least one algorithmic module $M_S$, and
- a second probability generated based at least on the supervised feedback.

9. A method of examination of a semiconductor specimen by a processor and memory circuitry (PMC), the method comprising:
- obtaining a set of images of one or more semiconductor specimens,
- obtaining a plurality of algorithmic modules, each algorithmic module being configured to provide, based on an image of a semiconductor specimen, data representative of one or more defects in the image,
- (1) for an image of the set of images, selecting at least one algorithmic module $M_S$ out of the plurality of algorithmic modules,
- (2) feeding the image to the at least one algorithmic module $M_S$ to obtain data $D_{MS}$ representative of one or more defects in the image,
- (3) obtaining a supervised feedback regarding rightness of data $D_{MS}$ provided by the algorithmic module $M_S$,
- (4) repeating (1) to (3) for a next image of the set of images until a completion criterion is met, wherein an algorithmic module selected at (1) is different for at least two different images of the set of images,
- generating, based at least on the supervised feedback, a score for each of the plurality of the algorithmic modules, and
- using scores associated with the algorithmic modules to identify one or more algorithmic modules $M_{best}$ as the most adapted among the plurality of algorithmic modules for providing data representative of one or more defects in the set of images.

10. The method of claim 9, wherein selecting the at least one algorithmic module $M_S$ out of the plurality of algorithmic modules is provided by a selection module trained to select the at least one algorithmic module $M_S$.

11. The method of claim 9, wherein the score generated for an algorithmic module is representative of a ratio between a number of times a positive feedback has been obtained for the algorithmic module and a number of times the algorithmic module has been selected at (1).

12. The method of claim 11, wherein the supervised feedback obtained at (3) impacts subsequent selection of the at least one algorithmic module $M_S$ at (1) by the selection module.

13. The method of claim 9, further comprising generating at (3) a score for the algorithmic module $M_S$, which is representative of a probability that the algorithmic module $M_S$ is adapted to provide data representative of one or more defects in the set of images, wherein the score depends at least on the supervised feedback.

14. The method of claim 13, wherein:
- if the supervised feedback validates $D_{MS}$ at (3), the score associated with $M_S$ is increased with respect to a score previously associated with $M_S$;
- if the supervised feedback rejects $D_{MS}$ at (3), the score associated with $M_S$ is decreased with respect to a score previously associated with $M_S$;
- the at least one algorithmic module $M_{best}$ is associated with a score which is the highest among the plurality of algorithmic modules.

15. The method of claim 13, further comprising generating a score for each algorithmic module based on:
- a first probability provided by a selection module trained to select the at least one algorithmic module $M_S$, and a second probability generated based at least on the supervised feedback.

16. The method of claim 9, further comprising selecting at (1) the algorithmic module $M_S$ based at least on a score associated with the algorithmic module $M_S$ and generated based at least on a supervised feedback previously obtained at (3).

17. A non-transitory computer readable medium comprising instructions that, when executed by a processor and memory circuitry (PMC), cause the PMC to perform operations comprising:

obtaining a set of images of one or more semiconductor specimens, upon obtaining a plurality of algorithmic modules, wherein each algorithmic module is configured to provide, based on an image of a semiconductor specimen, data representative of one or more defects in the image:

(1) for an image of the set of images, selecting at least one algorithmic module $M_S$ out of the plurality of algorithmic modules, (2) feeding the image to the at least one algorithmic module $M_S$ to obtain data $D_{MS}$ representative of one or more defects in the image, (3) obtaining a supervised feedback regarding rightness of data $D_{MS}$ provided by the algorithmic module $M_S$, (4) repeating (1) to (3) for a next image of the set of images until a completion criterion is met, wherein an algorithmic module selected at (1) is different for at least two different images of the set of images, generating, based at least on the supervised feedback, a score for each of the plurality of the algorithmic modules, and using scores associated with the algorithmic modules to identify one or more algorithmic modules $M_{best}$ as the most adapted among the plurality of algorithmic modules for providing data representative of one or more defects in the set of images.

* * * * *